(12) United States Patent
Li (10) Patent No.: US 10,332,098 B2
(45) Date of Patent: Jun. 25, 2019

(54) MOBILE PAYMENT SYSTEM AND METHOD WITH MULTIPLE OPTIONS

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 663 days.

(21) Appl. No.: 15/009,838

(22) Filed: Jan. 29, 2016

(65) Prior Publication Data

US 2016/0224972 A1 Aug. 4, 2016

Related U.S. Application Data

(60) Provisional application No. 62/110,458, filed on Jan. 30, 2015.

(51) Int. Cl.
*G06Q 20/30* (2012.01)
*G06Q 20/32* (2012.01)

(52) U.S. Cl.
CPC ..... *G06Q 20/3274* (2013.01); *G06Q 20/3223* (2013.01)

(58) Field of Classification Search
CPC ................ G06Q 20/3274; G06Q 20/3223
USPC ...................................... 705/35, 39
See application file for complete search history.

(56) References Cited

U.S. PATENT DOCUMENTS

| | | | | |
|---|---|---|---|---|
| 2012/0185398 | A1* | 7/2012 | Weis | G06Q 20/20 705/75 |
| 2013/0041811 | A1* | 2/2013 | Vazquez | G06Q 30/06 705/39 |
| 2013/0124413 | A1* | 5/2013 | Itwaru | G06Q 20/4012 705/44 |
| 2014/0337138 | A1* | 11/2014 | Chitalia | G06Q 20/322 705/14.64 |
| 2015/0058145 | A1* | 2/2015 | Luciani | G06Q 20/3274 705/17 |
| 2016/0027042 | A1* | 1/2016 | Heeter | G06Q 30/0248 705/14.47 |

* cited by examiner

*Primary Examiner* — William E Rankins (57) ABSTRACT

System and method for implementing mobile payment. A payee such as a merchant sends transaction center a message containing a payment amount and payee info. A payer such as a user sends transaction center a message containing a code and payer info. The payee is represented by the code. Multiple options may be arranged for the user to acquire the code. Transaction center uses the code to identify the payee, relates the payer to the payment amount, and then starts processing the payment request.

20 Claims, 4 Drawing Sheets

MOBILE PAYMENT SYSTEM AND METHOD WITH MULTIPLE OPTIONS

CROSS REFERENCE TO RELATED APPLICATION

This application is entitled to the benefit of Provisional Patent Application Ser. No. 62/110,458, filed Jan. 30, 2015.

FEDERALLY SPONSORED RESEARCH

Not applicable

SEQUENCE LISTING OR PROGRAM

Not applicable

BACKGROUND

Field of Invention

This invention relates to mobile payment, more particularly to implementing mobile payment process with multiple options.

Description of Prior Art

Mobile payment by smartphones and potentially other mobile devices such as smart watches represents a growing trend, although payments with credit card, debit card, check, and cash are still dominant in stores these days. In fact, some merchants may be reluctant to create a mobile payment system because of cost concerns. For instance, both near-field communication (NFC) and quick response (QR) code are popular mobile payment methods. But both would require new hardware and software upgrade for point of sale (POS) systems. The expense may be viewed as extra and unnecessary by retail business, especially small retailers. Demand for mobile payment is another factor that influences a merchant's decision, which, however, is still relatively low right now. If the demand could justify investment, merchants may want to accommodate it. The demand, on the other hand, is related to the availability of mobile payment at stores. If more merchants accept mobile payment, users may be more likely to develop a habit to use it. Thus, whether merchants are willing to add new technology at stores is the key in the emerging proliferation of mobile payment.

Therefore, there exists a need for a mobile payment method which is affordable for merchants and relies upon current POS systems at stores.

OBJECTS AND ADVANTAGES

Accordingly, several main objects and advantages of the present invention are:

a). to provide improved methods and systems for mobile payments;
b). to provide such methods and systems which are affordable for merchants;
c). to provide such methods and systems which rely on a merchant's current system;
d). to provide such methods and systems which use a code to represent a merchant;
e). to provide such methods and systems which utilize a card reader for mobile payment;
f). to provide such methods and systems which utilize a merchant's smartphone or tablet computer for mobile payment;
g). to provide such methods and systems which provide multiple options for a user to do mobile payment;
h). to provide such methods and systems which provide multiple options for a merchant to implement mobile payment.

Further objects and advantages will become apparent from a consideration of the drawings and ensuing description.

SUMMARY

In accordance with the present invention, methods and systems are proposed for mobile payment process. First a merchant may get a payment amount and send it to transaction center. In the meantime, a user may get a code which represents the merchant and transmit it to transaction center. Next the center may use the code to relate the user to the merchant and then to the payment amount. After the merchant and user info is authenticated, the center may transfer fund from a user account to a merchant account or get authorization of payment from a financial institution. A user device may acquire a code through multiple methods including NFC, QR code, location based, and manual input. A merchant may get connected to transaction center via a POS system, a card reader, or a mobile device.

REFERENCE NUMERALS IN DRAWINGS

| 10 | Camera | 12 | Device |
|----|--------|----|--------|
| 14 | Processor | 16 | Computer Readable Medium |
| 18 | GPS Sensor | 20 | NFC Sensor |
| 22 | Accelerometer Sensor | | |

100, 102, 104, 106, 108, 110, 112, 114, 116, 118, 120, 122, 124, 126, 128, 130, 132, 134, 136, 138, 140, 142, 144, 146, 148, 150, 152, 154, 156, 158, 160, 162, 164, 166, 168, 170, 172, and 174 are exemplary steps.

DETAILED DESCRIPTION

Figure 1:
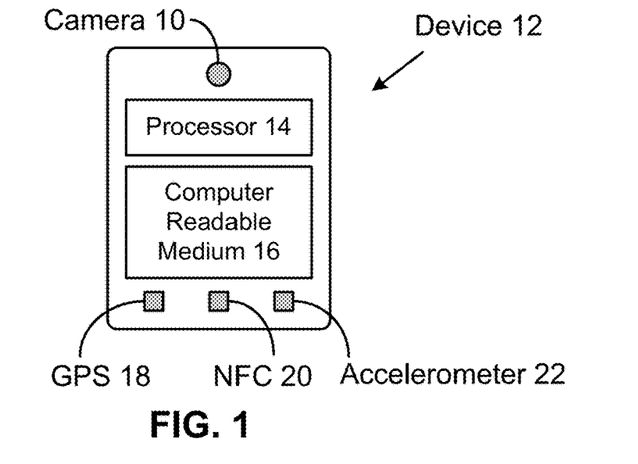
FIG. 1 is an exemplary block diagram describing a user device embodiment in accordance with the present invention.

FIG. 1 is an illustrative block diagram of one embodiment according to the present invention. A device 12 may represent a wireless electronic device, including but not limited to mobile phone, smart phone, smart watch, wearable device, personal computer, tablet computer, and the like. Device 12 may include a processor 14 and computer readable medium 16. Processor 14 may mean one or more processor chips or systems. Medium 16 may include a memory hierarchy built by one or more memory chips or storage modules like RAM, ROM, FLASH, magnetic, optical and/or thermal storage devices. Processor 14 may run programs or sets of executable instructions stored in medium 16 for performing various functions and tasks, e.g., surfing on the Internet, placing phone call, logging on a website, playing video or music, gaming, electronic payment, social networking, placing purchase order, sending and receiving email, short message, file, and data, executing other applications, etc. Device 12 may also include input, output, and communication components, which may be individual modules or integrated with processor 14. Communication components may connect the device to a server or another device via communication networks. Usually, Device 12 may have a display (not shown in FIG. 1 for brevity reason) and a graphical user interface (GUI). A display may have liquid crystal display (LCD) screen, organic light emitting diode (OLED) screen (including active matrix OLED (AMOLED) screen), or LED screen. A screen surface may be sensitive to touches, i.e., sensitive to haptic and/or tactile contact with a user, especially in the case of smart phone, tablet computer, smart watch, smart band, and other wearable devices. A touch screen may be used as a convenient tool for a user to enter input and interact with a system. Furthermore, device 12 may also have a voice recognition component for receiving verbal commands or audio input from a user.

A communication network which device 12 may access may cover a range of entities such as the Internet or the World Wide Web, a local area network (LAN), a wide area network (WAN), a metropolitan area network (MAN), a telephone network, an intranet, wireless, and other types of networks. Device 12 may be connected to a network by various wired, wireless, optical, infrared, ultrasonic or other communication means. Via a network, device 12 may communicate with a remote server or service center to send and receive data or messages.

Device 12 may include a camera sensor 10 which may be a smartphone camera module for use in daily life. The camera sensor may be arranged to scan QR code, one-dimensional barcode, or any other machine-readable code with the help of certain application. A QR code or barcode may be printed out easily and displayed conveniently.

Device 12 may include a global positioning system (GPS) 18. Sensor 18 may enable a device to get its own location info. Besides GPS, device location may also be obtained using wireless triangulation methods, or other suitable technologies, which may be prepared by a service provider or on-site service facility. Usually for indoor or some urban environment, positioning methods other than GPS are used, since GPS requires a clear view of the sky or clear line of sight for four GPS satellites.

Furthermore, device 12 may have NFC capability enabled by NFC sensor 20. NFC is of short-range wireless communication technology and may be employed to communicate securely with another NFC device. Sensor 20 may also be used to read a radio-frequency identification (RFID) tag. RFID is also a wireless technology for the purpose of transferring data, such as identification data, passively or actively. A RFID chip or RFID tag may be made very small in size, e.g., smaller or much smaller than one millimeter. It may also be manufactured at low price by semiconductor technologies. In applications, a RFID tag may be placed, for instance, on a store counter or a poster conveniently.

Moreover, device 12 may contain an accelerometer sensor 22 to detect its own movement, such as acceleration, deceleration, and rotation. Sensor 22 may comprise accelerometers and gyroscopes, which are already mass produced by semiconductor technologies, and widely used in smartphones and other personal gadgets. With sensor 22, device shaking or waving may be detected and used as user input or command when such functionality is desired.

Inside device 12, output signals of sensors may be transmitted to processor 14, which, employed with certain algorithm, may process the data and act according to predefined programs. For instance, processor 14 may process data from sensor 20, transmit certain messages to a remote transaction center, and then wait for instructions or messages from the center.

Figure 2:
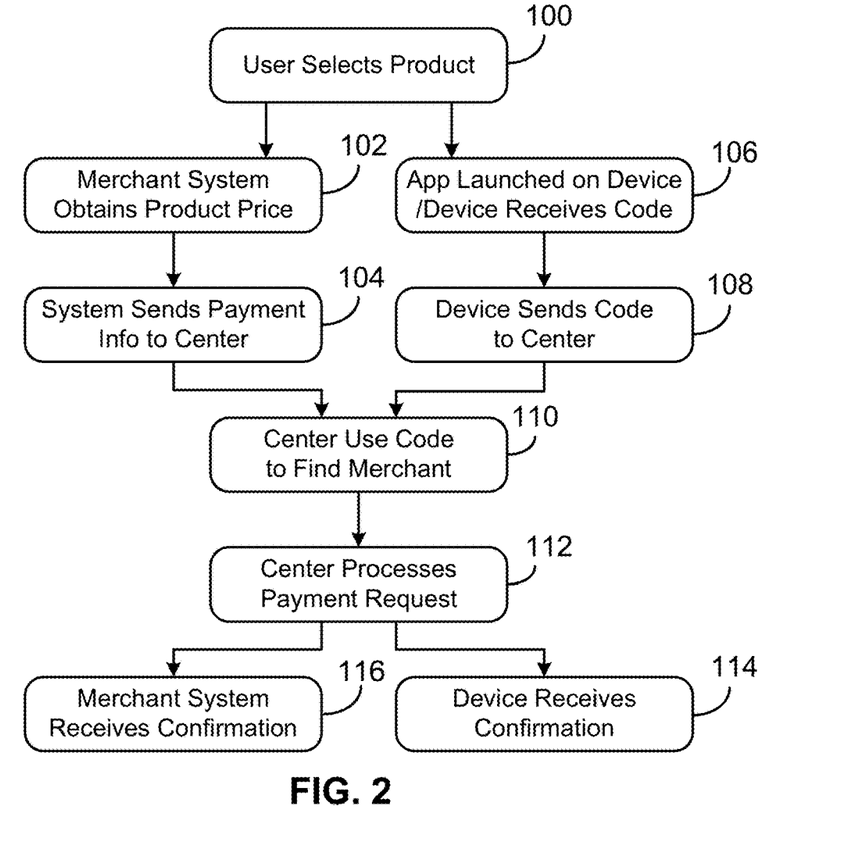
FIG. 2 is an exemplary flow diagram showing one embodiment of mobile payment process in accordance with the present invention.

FIG. 2 is a schematic flow diagram showing one embodiment of mobile payment. Assume that a user is at a store and wants to make purchases. In Step 100, the user selects a product and hands it to a merchant. In Step 102, the merchant scans the product to get price and a merchant system, e.g., a POS system, may record the price. Assume the user wants to pay using his or her mobile device. Then in Step 104, the merchant sends an encrypted message to transaction center via the merchant system. The message contains payment amount of the purchase and sender info, that is, identification info of the merchant.

Meanwhile in Step 106, the user may start a mobile payment app to prepare for mobile payment. First, the user may manage to get a code associated with the store. A code is designed to represent a store at transaction center. It may be registered at transaction center by a merchant and contain a string of number, character, alphabetic character, and/or sign. After registration, a code is assigned to a store exclusively by transaction center. Duplicate code for another store should be prevented. In order to own a code, an applicant such as a merchant may open an account at transaction center and enroll in a code program. Next, the applicant may apply for code for a business or any entity. The applicant may submit a request for a specific code or let transaction center choose one. A code may have some condition or no condition attached. For instance, the applicant may specify certain condition and add it to a code. Conditions may include a selected geographic location, such as a store location, or a time period in which a code remains effective. The applicant may also apply two codes or two forms of code for one account, e.g., a long code to be obtained by machine and a short code more suitable for manual input. A long code may be arranged distinctive at transaction center. A short code may not be distinctive by itself, but may be unique when it is bundled with certain condition like location or time. For instance, a short code may be a number containing only one, two, or three digits. Back to the flow diagram. After obtaining a code, the mobile device sends it to transaction center in Step 108. The code may be wrapped in an encrypted message.

Now transaction center receives two messages, i.e., payment info from the merchant and the store code from the user. From the merchant message, the center gets merchant info and a pending amount which is scheduled to be transferred to a merchant account or payee account. From the user message, the center receives the code, which may lead to the merchant or payee account, and user info, which may lead to a user account or payer account. Thus in Step 110, the center uses the code to find the merchant account and prepares fund transfer from user account to the merchant account. The transfer amount is of the payment amount retrieved from the merchant message. But before processing a payment request, both the merchant message and the user message have to be authenticated to make sure they are from legitimate subscribers. After verification procedures, in Step 112, the center starts processing fund transfer. Finally after authorization of payment is obtained, the center sends the user a confirmation message in Step 114, and sends the merchant a confirmation message in Step 116. Then the merchant may give the product to the user. A payment process is completed.

Figure 3:
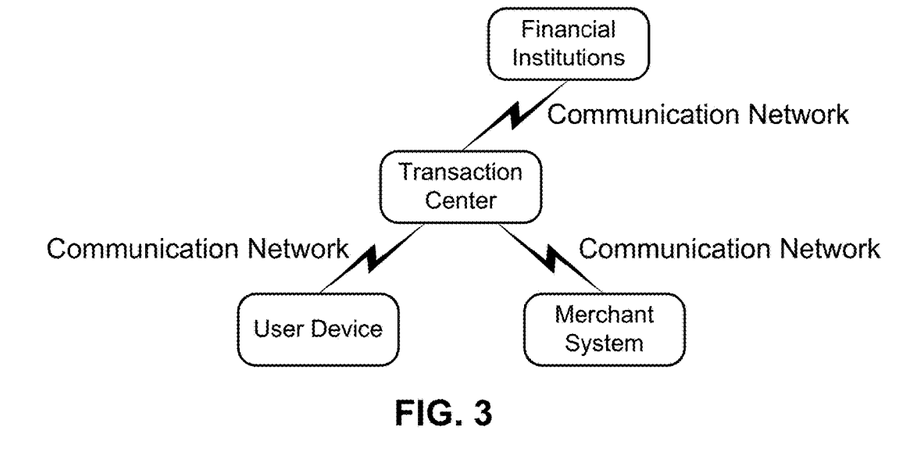
FIG. 3 is an exemplary block diagram which illustrates mobile payment environment in accordance with the present invention.

FIG. 3 shows a graphic diagram to illustrate an overall mobile payment environment. A user device, such as a smartphone or smart watch, is wirelessly connected to transaction center via a communication network. A merchant system is also connected to transaction center, wirelessly or via cables through a network. Financial institutions, like acquiring banks, issuing banks, credit card processing facilities, are also connected to the center. Specially arranged programs or applications may be installed at the merchant system, user device and transaction center respectively, which are designed to implement mobile payment. As discussed in FIG. 2, a user device sends the center a code, while a merchant system sends it a payment amount. The center uses the code to identify a merchant account and relate the user to the due payment amount. After the authentication process, the center starts contacting financial institutions to get payment authorization.

In order to participate in mobile payment, merchants and users may be required to register and set up merchant accounts and user accounts at transaction center respectively. A merchant account, as payee account, may be configured to receive fund from other accounts. A user account, as payer account, may or may not have deposit of fund for transfer purpose. In order to transfer fund from a user account directly, the account may be pre-deposited with certain amount of money. A user account at transaction center may also be connected to a bank account. Then a user may use the bank account to transfer fund. For users who prefer to using credit card, a user account may be arranged to be associated with a credit card account at a financial institution. Thus instead of performing fund transfer, transaction center may get payment authorization from the institution. For instance, if a user account is connected to a credit card account, any mobile payment would be charged to the credit card account. When transaction center receives a payment request and completes an authentication process for the user and merchant, the center may deal with financial institutions and get authorization of payment for the request. After payment authorization is received, the center may send confirmation messages to both the merchant and user.

It is noted that when a user device sends a code to transaction center, the message may contain a code and brief info about the user; and when the center replies to the user, its message may also be brief, maybe just a merchant name and a payment amount for a quick confirmation. Additionally, a response from transaction center to the user may also contain an authorization request as an additional protective measure. In such a case, a payment process only proceeds when a user approves it. The user may push or tap a button on a user device to authorize the payment request. When a payment process is done, the center may send the user another response as a second message to confirm the transaction. Since these kinds of message are brief and concise, even with not so fast networks, the communication between a user device and the center may still fit the needs.

As discussed, a code plays an important role in proposed mobile payment schemes. It is the code which relates a user account to a merchant account. Moreover, a code is just a representation symbol and only transaction center has its corresponding merchant account number or payee account number. Beside a code, communications between a user device and transaction center and between a merchant system and the center mainly contain a payment amount, merchant ID, and user ID. Thus, there is no sensitive information involved. Therefore, merchant and user accounts at the center, and users' accounts at other institutions are protected and shielded by the center. Leak of sensitive information is prevented, as long as transaction center addresses security issues properly.

Figure 4:
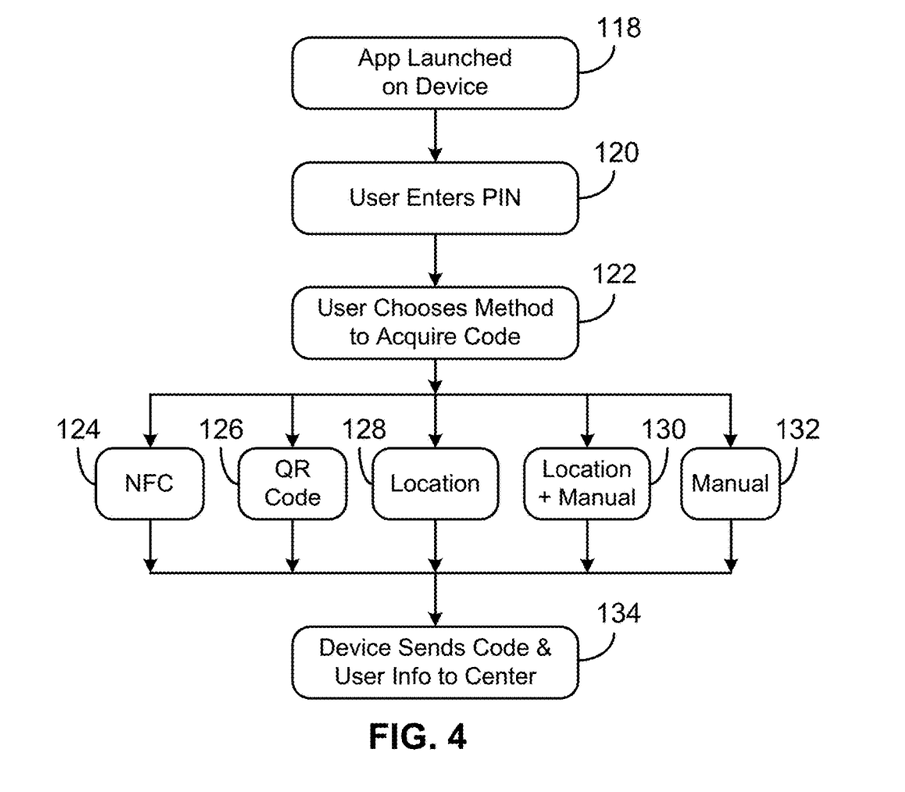
FIG. 4 is an exemplary flow diagram showing embodiments of acquiring a code in accordance with the present invention.

FIG. 4 shows an exemplary flow diagram describing several embodiments for getting a code at a store. As mentioned before, the code is a critical part in the proposed mobile payment process. It should be affordable and flexible for a merchant to provide a code-acquiring mechanism for users. When a merchant is willing to invest in mobile payment environment, multiple mechanisms may be arranged at store to provide different mobile payment methods for users. If a merchant is conservative and hesitant to spend funds, an inexpensive method should be available, which may at least satisfy the basic needs of mobile payment. More merchants may participate in mobile payment, when less costly option is available. In addition, it should be easy and convenient for a user to obtain a code, such that users may be more likely to get accustomed to do it. As a user device may be equipped with different sensors and users may have different preferences, multiple choices provided by a store may improve user experience.

Assume that a user is ready to make a payment at a store. In Step 118, a mobile payment app or application is launched. The app may be created by transaction center or a software company. It may be downloaded from a website and installed on a user device. Assume that the app can be used to make payment via various methods as discussed in below. A user may manually start the app or hold a mobile device close to an NFC device and let the NFC device awake the user device and start the app. Next in Step 120, a user may enter personal identification number (PIN), which may also be arranged at a later step. PIN may be replaced by other authentication means such as fingerprint method or facial recognition. Next in Step 122, a user may select an option to obtain a merchant code or store code. Alternatively, a user device may be set up to choose an option automatically. The objective is to get a code assigned to the store. As discussed, a code for machine use, i.e., to be sensed or obtained by a machine, may be defined without concerns of code length. But if a code is prepared for manual input, it should be relatively not too long, such that a key-in job may not be difficult and challenging. Whether a code is short or long, it has to be distinctive so that no duplicate exists and one code points to one entity only. As there aren't many short codes, a short code may be combined with a distinctive factor or condition, like location, to make it unique. A code may contain a number, a letter, or a sign, or combination of elements. A short code may have a few elements or digits only. Examples of short code may include "1", "12", or "123".

Step 124 is of NFC method. To implement the scheme, a user device has to be equipped with an NFC sensor, such as sensor 20 of FIG. 1, and a merchant has to set up an active NFC device or display an active or passive RFID tag. It may become a quick payment process if both parties are NFC compatible. A user device may be awaken by NFC signals at a POS spot so that there is no need to manually terminate a standby state and start a payment app at the user device. With NFC technology, a code is automatically obtained when a user device is placed close to an NFC device or RFID tag. But some stores may not have NFC devices and some merchants may be reluctant to make investment to set it up.

In such a case, RFID tag may be another option. RFID tag is inexpensive and widely used already. It may be placed publicly for users to access. For instance, a store may set up an account at transaction center, get a code to represent the store, and then spend a little to get a RFID tag which contains the code and store info. When a RFID tag is available at a store, a user may place his or her mobile device close to it to acquire code and store info conveniently. After getting a code, in Step 134, a user device may send an encrypted message to transaction center, which may carries code and sender info, i.e., user info. When desired, the message may also contain other info like store ID, which may be transmitted by an NFC device or extracted from a RFID tag. When store ID is provided along with a store code, transaction center may check whether the code is registered under the ID. It may reduce the chance of error due to submission mistake. When store ID is included in a user message, user confirmation or authorization of a pending mobile transaction may be skipped.

In Step 126, a user may choose QR-code method. A QR code may be prepared to present a store code by a merchant. As discussed, a store code is assigned exclusively to a store or any entity at transaction center. After completing store code application, a merchant may create a QR code. Data from the QR code may be arranged to contain a store code and store ID, both of which are registered at transaction center. A QR code may be printed out and displayed beside a POS counter. As all smartphones have a camera module, like camera 10 of FIG. 1, it may be used to scan a QR code using certain scanning application. In practice, a mobile payment app may be designed such that after it gets started, a scan mode is automatically turned on. So a user may aim a camera at a code immediately. It is seen that the cost of QR code method is relative low, as no hardware is needed on the merchant side. After a QR code is scanned, a user device may send code info to transaction center in Step 134.

NFC and QR-code methods rely on a sensor to obtain a code. Step 128 introduces a location method which also relies on sensing techniques, such as GPS, on-site service facility, or service provider. Since location data is distinctive, it may be used as a code to represent an entity registered at the location. For instance, a store may register its location as one form of store code besides obtaining a regular code as discussed in the above. Registered location data may include geographic coordinates plus a value of radius, while a location-based code may comprise the coordinates. So a registered location may cover a circular area centered at a spot, which is defined by geographic coordinates. When location data is registered as code, and it is detected that a user device is at the location, or within a certain distance from the location, the user device may automatically obtain a location-based code. For instance, when a user is at a store and his or her location is determined with adequate precision, the user's device may receive location-based store code right after a payment app is launched. When locations of several merchants are close, and all of them have registered location-based code at transaction center, a user device may receive more than one store code based on the location method. Then a confirmation step may be arranged to avoid hooking up with a wrong store. Assume that a payment app is started and the location of a user or a user device is measured via a GPS sensor, such as sensor 18 of FIG. 1, or triangulation method. The user device may automatically send location info to transaction center. The center may search a lookup table or database and find out which entity registers a code for the location. Then the center may send to the user a list of relevant entities. If there is only one eligible candidate on the list, the user may confirm it. If multiple targets show up on the list, the user may choose one. Next in Step 134, the user may send a message back to the center. For instance, when a list appears on a display of a user device, a user may tap or press an icon to choose one, and then hit a "Send" button. Then the center may receive confirmed merchant info needed for payment process. An entity may register a code of regular format first, which may contain a string of number, letter, or sign, and then obtain a coordinates-based code as a useful alternative. The two types of code support different technologies and provide different options for both merchants and users. It may bring convenience and become a desirable feature.

When the location method produces multiple results, a list of choice shows up on screen and a user has to select one. But making selection may cause difficulty in some cases. To overcome it, a relatively short code may be introduced. Location data plus a short code may be arranged to represent an entity distinctively. Take a store for instance. If a store has multiple POS systems, the location of user has to be accurate enough so that each POS machine can be identified correctly and automatically. As it may be inside a building, positioning means other than GPS may be used, such as WiFi triangulation or ultrasonic method. When positioning scheme is not accurate enough, Step 130 provides a remedy, i.e., location plus manual input of short code, where each short code is arranged unique at the location. For instance, after a payment app is launched, a user may be asked to select or confirm a store after location data is obtained and then submitted to transaction center. But selecting a store alone doesn't solve the problem, because the store has several cashier machines at different POS spots which are close to each other. Then the user may pick a POS system manually by entering a short code. The short code may be displayed beside a cashier machine which processes the user's purchases. In practice, a touch-sensitive screen of a user device may display a list of business or several logos. A user may tap one object to select one business. Then a key-in window may show up on screen, asking for a short code. The user may find a corresponding code on a cashier machine, which may be a one-digit or two-digit number like "2" or "11", assuming one-digit or two-digit codes could provide enough choices. Next the user may enter the code at the user device in Step 130, which means a POS system is chosen among multiple ones. And subsequently, the short code, along with location info and user info, may be sent to transaction center in Step 134.

It is noted that a location-based code represents a store, as an entity, while a short code represents a POS system of the store, as a sub-entity. A sub-entity belongs to an entity and shares an account of the entity at transaction center. Both a merchant and a user may send transaction center a short code in a message. When the center receives location-based data as a merchant code, it may be arranged to look for a short code. When a short code appears in both merchant and user messages, the center may compare them. Only when the two codes are identical, the two messages are related and payer-payee relationship gets established. In such a circumstance, a merchant may set up multiple accounts for all POS systems at transaction center. Each POS system may have more than one code including, for instance, a code for the NFC method and a code which combines location-based code and a short code. Alternatively, it may also be arranged that a merchant doesn't need to register a short code when using it with a location-based code. The reason is that a location-based code already fully represents a merchant account. When transaction center obtains a location-based code and short code in a user message, it may use the former to find a merchant account and then retrieve messages sent from that account. Next the center may search retrieved messages to see which contains a matching short code. Then two messages may be related. Therefore, there may be no need to register a short code, as it is under a registered entity and doesn't affect fund transfer from a user account to a merchant account. There may be no need to notify transaction center before using the short code, when use of the short code is clearly defined and arranged by transaction center.

If NFC, QR code, and location schemes are all unavailable either due to lack of arrangement at a place or lack of capability of a user device, a user may still make payment using an app installed at his or her device. In Step 132, a user may manually input a code, after reading it, for instance, on a store poster. To make it less challenging, a code for use of key-in should be selected carefully so that entering it on a device won't be too much for average users. After a code is fed in, the user device may send it to transaction center in Step 134. As manual entry is prone to human errors, a confirmation step may be arranged, which may be designed to confirm a store or confirm a store name and a payment amount together. After a user makes confirmation, the payment process may continue.

It is noted that the location methods (as reflected in Step 128 and 130) and manual method (as in Step 132) may not cost much for implementation. It is also noted that an entity like a business may select from the following types or forms of code for representation: relatively complex long code for NFC or QR-code method; location data; location data plus a relatively short code; and code for key-in. To support multiple code-acquiring schemes, more than one type of code may be registered and owned by an entity. For instance, a store may register Code 1 for NFC and QR-code methods, Code 2 which contains location data, and Code 3 for key-in use. It may also be designed that a code for NFC or QR-code method stays permanently with a payee account, while a code used for manual entry may be changed by payee at times. For instance, a merchant may register a code for NFC and QR-code methods. The code may remain effective as long as the merchant's account remains at transaction center. The merchant may also register a code for manual input. This code may be changed by the merchant according to the actual practice. If users like the code, it may stay. If users dislike the code, it may be changed. Changing of code may need approval by transaction center. When a store is represented by several codes respectively, it provides multiple options for users and makes mobile payment convenient and more accessible. On the other hand, it may be arranged that NFC, QR-code, and manual methods use the same code, when a code is selected carefully.

To get a code via NFC or QR-code method, a user may place a mobile device close to a NFC device or a RFID tag, or perform a scanning act. Unless another user does the same thing, which may be easily noticed, transaction center receives only one message from payer side at a time. Thus, a user may wave a mobile device or scan a QR code, send a message to transaction center, and then wait for response from transaction center, knowing the center receives only one message, i.e., his or her message. A message from a user to transaction center may be arranged to contain method info besides code and user info, such that transaction center gets to know which code-acquiring method is employed by the user and whether any extra measure should be taken, such as an authorization step. After a payment process is completed, transaction center may send a user a message. The message may mainly serve as a confirmation to remind the user of what happened or how much is paid to a store. User confirmation before a payment process starts, which may be arranged to confirm the name of a payee and possibly an amount of payment, may be omitted for the NFC and QR-code methods, although a user may add such a step if it is desired.

When the location, location plus manual input, or manual input method is involved, more than one user device may send messages to transaction center carrying the same code at the same time period. For instance, two users may open a payment app at the same spot in a store, or key in a posted merchant code within the same time window. Consequently, errors may happen. To prevent such incidents, transaction center may check the method type in a user message first. If location or manual method is cited, the center may send a first message to a user device, which asks the user to confirm the name of payee and whether it is time to pay. For instance, a screen of a user device may show a message from transaction center, which may contain the store name and a question like "Pay now?" to let the user decide. The message may also show a payment amount as another layer to prevent errors, if payment info is already received from a merchant message. There may be arranged two icons "Yes" and "No" beside the "Pay now?" question. When "No" is selected or no action is taken within a given period of time, the payment process may be cancelled. When "Yes" is selected, transaction center may resume the process and send the user a second message to confirm the transaction after payment authorization is obtained or fund is transferred.

Figure 5:
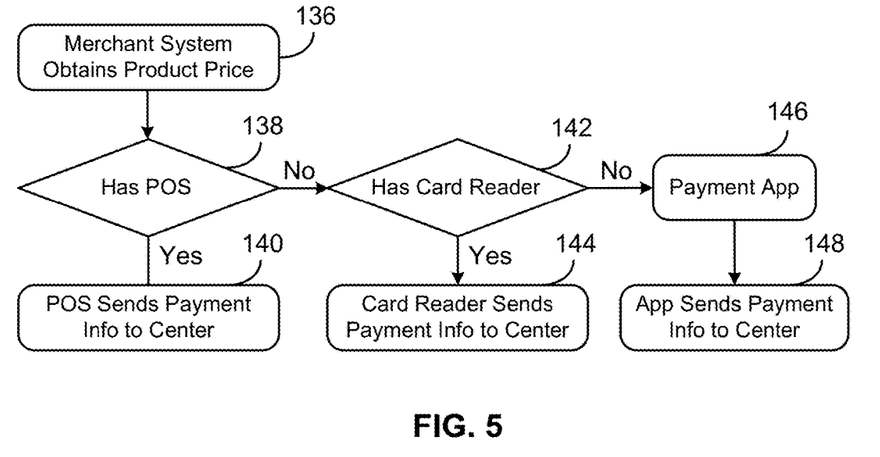
FIGS. 5 and 6 use exemplary flow diagrams to show embodiments of payment process in accordance with the present invention.

FIG. 5 shows a schematic flow diagram of embodiments which describes sending payment info to transaction center from a merchant system. Assume a user hands a product to a merchant and wants to pay it by a mobile device. The user may choose NFC, QR-code, location, location plus manual entry, or manual entry method. The merchant scans a barcode on the product to get the price in Step 136. In Step 138, if a POS system is available to process mobile payment, e.g., it may run a specially designed payment program, the system may send payment info to transaction center in Step 140. Payment info may be arranged to include merchant ID as registered at the center and a payment amount which will be charged to a payer. So transaction center is informed of which entity expects a payment and what amount is involved. If NFC method is used, the message may contain more info such as user ID (as payer ID). User info may come from a user device during an NFC dialogue between the user device and the POS system. Thus with a compatible POS system, it may enable a seamless process: Once price info is obtained, it is sent to transaction center immediately. But a new POS system may be costly and POS system upgrade for mobile payment may be expensive too. So some merchants may be reluctant to move forward, which leads to Step 142 where a card reader is utilized for processing mobile payments.

A card reader may be a regular card-reading device which handles credit card and debit card at a business. Card readers are well accepted and used at many big and small stores nowadays. A merchant may swipe a credit card or debit card to charge an amount on the card account. A card reader may be used for mobile payment with the help of a specially prepared connection card. A connection card may be designed and issued by transaction center. It may be arranged to contain info of a merchant and transaction center. After a connection card is swiped, a card reader may send out a message or prepare to send out a message in Step 144. The message may contain a payment amount, merchant info, and transaction center info. A payment amount, i.e., total purchase amount, may be fed by a POS system or entered by the merchant manually. A message may be sent out after a push button on the card reader is pressed. Merit of using a card reader is that a merchant may rely on the current POS setup. A connection card may be generated by transaction center, after a merchant applies for it and submits needed information. The card may cause a card reader to transmit a message to an acquiring bank of the merchant, which then may relay the message to transaction center according to certain arrangement made in advance. Therefore with no cost or a small cost of connection card, a merchant may use the current equipment to enable mobile payment.

If card reader is not available either, a merchant may download and install a mobile payment app at a tablet computer or smartphone. The app may be free or cost a little. The merchant runs the app at a computer or smartphone in Step 146, and sends transaction center payment info in Step 148. Using the app, a payment amount may be collected from a store POS system automatically or keyed in by the merchant manually. Thus there are at least two methods which cost a merchant nothing or only a little as shown in Step 142, 144, 146, and 148.

Figure 6:
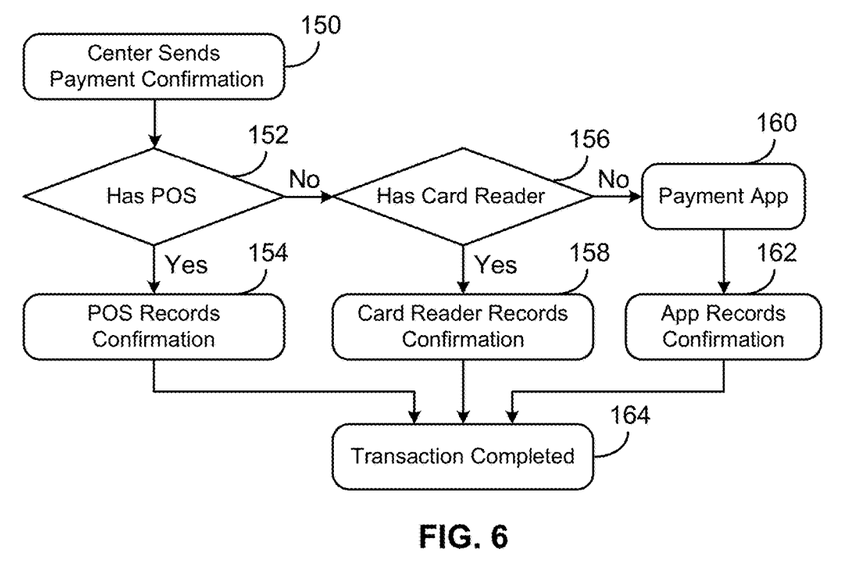

FIG. 6 shows a schematic flow diagram of embodiments which illustrates receiving replies from transaction center after payment info is submitted there. Again, take a store setting for example. Assume that in Step 150, transaction center completes processing a mobile payment and then sends confirmation messages to a user device and a merchant system respectively. In Step 152, whether a store has a compatible POS system determines how a message is handled. If the POS system has proper capability, a confirmation message may be recorded by the system directly in Step 154, and a transaction process may end in Step 164. If a POS system is not ready to handle messages from transaction center, the next question is whether a card reader is involved in the process, as shown in Step 156. If a store uses card readers for mobile payment, the card reader may be arranged to receive, show and record or print out confirmation messages from transaction center in Step 158. The confirmation message may be routed to an acquiring bank first, and then the bank transmits it to the card reader. If a store doesn't have a card reader, it is assumed that a payment app is running at a device, like a smartphone or tablet computer at the store. The app processes messages received in Step 160 and records them in Step 162. Then the transaction ends in Step 164. Since card readers may already exist at many stores and a payment app for user devices may be free or have a small price tag, a merchant may be able to add mobile payment capability with petty expense.

Figure 7:
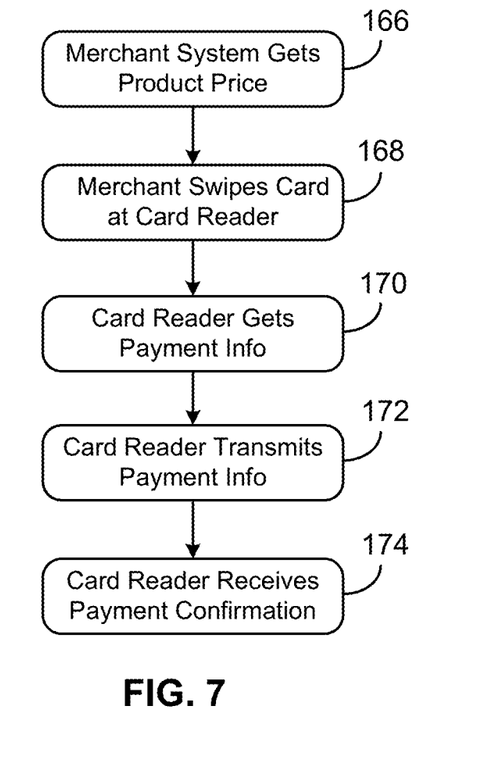
FIG. 7 is an exemplary flow diagram illustrating embodiments of using a card reader in mobile payment in accordance with the present invention.

FIG. 7 depicts a schematic flow diagram of using a card reader and a connection card. As discussed, a connection card may be issued to a merchant by transaction center which contains merchant info and transaction center info. Assume a merchant is processing a mobile payment. In Step 166, price info and payment amount is obtained after scanning a product. The merchant may enter the payment amount at a card reader or the amount may be transferred to the card reader from a POS system automatically. Next in Step 168, the merchant swipes a connection card at the card reader. Consequently in Step 170, the card reader reads it and gets data of the merchant and transaction center. The data and payment amount are encrypted in a message and sent to transaction center in Step 172. In practice, the message may be routed via an acquiring bank before reaching transaction center. Next transaction center receives the info which may indicate that a merchant is expecting a payment of a specific amount from a user. In the meantime, transaction center may receive another encrypted message from a user device which contains a code and user info. After receiving the code, merchant ID and merchant account are retrieved via, for example, a lookup table. Thus the two messages may be connected by the same merchant info. Then, a payment amount indicated in one message becomes related to the user in the other message, i.e., the user should pay the merchant by the cited payment amount. Next transaction center manages to transfer fund from a user account to a merchant account, or get payment authorization from an issuer bank of the user's credit card. After that, transaction center sends confirmation messages to the user device and the merchant system respectively. Then in step 174, the card reader or POS system gets a confirmation message.

Therefore, it is seen that a merchant may set up a new system or utilize an existing system to handle mobile payments. The cost involved may be manageable, which may encourage more merchants to add mobile payment capability, in particular small business merchants.

CONCLUSION, RAMIFICATIONS, AND SCOPE

Thus it can be seen that systems and methods are introduced to provide multiple options at various costs for mobile payment.

The improved method and system have the following features and advantages:
(1). A code is used to represent a merchant (as payee);
(2). A user (as a payer) has multiple options to do mobile payment, including the NFC, QR-code, location method, and manual input method;
(3). A merchant has multiple options to implement mobile payment, including the NFC, QR-code, location based, and manual input method;
(4). A merchant may use a card reader, a smartphone, or a tablet computer to support mobile payment;
(5). A merchant may spend only a little to set up mobile payment environment.

Although the description above contains many specificities, these should not be construed as limiting the scope of the invention but as merely providing illustrations of some of the presently preferred embodiments. Numerous modifications will be obvious to those skilled in the art.

Ramifications:

Using an accelerometer like sensor 22 of FIG. 1, shaking of a device may be used to start a payment app when a user is at a store. For instance, when it is detected that a user device is inside a restaurant, shaking of the device beyond a given period of time may be considered as a command to start a mobile payment app. Thus when a user is ready to foot a bill, he or she may shake a mobile device a bit to start a payment process.

A merchant and a store, as an example of a payee, are used to illustrate payment embodiments in most cases. A store may be replaced by other entities, such as a school, an organization, or a government agency, which may have a need to collect money and have registered an account at transaction center.

A user may speak to a device to enter a code using voice recognition techniques. For instance, a user may say a store code to a device, which may cause a code to appear on a touch-sensitive screen, and then the user may confirm it by saying a word like "correct", "yes" or "Send code", or tap a "Yes" icon on the screen. A verbally-input code may work alone or work with location data of the device, as the codes discussed in other instances.

If a merchant has an active NFC device, it may be designed that a code is created for each transaction without registration at transaction center. Such a code may be distinctive within a certain time period, say within a day. For instance, after a POS system gets a total purchase amount, the system may issue a code specifically for the transaction. The code may be sent to transaction center promptly along with the purchase amount. So the center knows a code is created for a transaction by a merchant. When a user device is held close to the NFC device, the code may be taken by the user device. Then the user device may transmit a message containing the code to transaction center. And transaction center may use the code to find the merchant in the same way or similar way as discussed. The method may reduce potential errors which may occur when transaction center receives messages from two users with the same code within a short period of time. The one-code-per-transaction scheme may also work with QR-code method. At a store for instance, an exclusive QR code may be generated for each transaction by a POS system. Contents of a QR code may contain an exclusive code designated to one transaction. After a user device scans a QR code which may be displayed on a screen of the POS system, it may extract the exclusive code and send it to transaction center, along with payer info; meanwhile the POS system may send the code, merchant info, and payment amount to transaction center. Next, transaction center may use the code to relate the user and merchant, and starts a payment processing process.

Availability of multiple codes or multiple code types for one merchant account is arranged by transaction center. Transaction center determines it and designs rules and implementation methods for such practice. Programs and applications may be arranged for implementation of multicode scenario at the center, store, and user device respectively.

It may be designed that a code arranged for one transaction may be created by bundling a registered store code with a case code which is generated by a merchant system. When a transaction center receives two codes in a message, it may use the store code for identification of a store account, and the case code as a label for locating a transaction. A case code may be produced by a merchant without the consent of transaction center. Thus without additional work at transaction center, a merchant may create and use a distinctive code to tag each transaction. For instance, when a merchant system handles a transaction and a user device is capable of receiving info from the system, the system may generate a case code after the merchant pushes a button. A store code and case code may be sent together to transaction center and a user device by a merchant system. The message from a store to the center may also contain a payment amount and store info as in other cases. Meanwhile, the user device may send the two codes to transaction center in a user message. At the center, the two codes may be used to connect the two messages, identify the user as the payer and the merchant as payee, and the payment amount as a due amount.

With an active NFC device at store, the communication between a POS system and a user device may be utilized. For instance, a user device may send an encrypted message to transaction center via a POS system, instead of a wireless network the device has access to. Assume that a POS system has high-speed connection to transaction center, like via land line or cable. Thus, communication via the POS system may be faster, more secure, and more reliable than wireless networks. Once a user device is in contact with a store NFC device, it may get signals which indicate whether a POS system may relay a message. If a POS system has the functionality, a user device may transfer an encrypted message containing a code and user info to the POS system via NFC technology. Next, the POS system may pass the user message to transaction center.

In above discussions, it is assumed that a mobile payment program or application is used at a POS system or a device like a smartphone or tablet computer at a store. The program or application may be arranged by transaction center or a software company.

If a payment app is installed at a card reader, the card reader may be arranged to communicate with transaction center directly. Then, messages may be sent to the center without going through financial institutions.

Lastly, in aforementioned discussions, QR code may be replaced by other machine readable codes without affecting the proposed results, such as one-dimensional bar code, as long as the code contains info needed and can be read by a user device.

Therefore the scope of the invention should be determined by the appended claims and their legal equivalents, rather than by the examples given.

The invention claimed is:

1. A method arranged for a payer's electronic device for payment transaction between the payer and a payee, comprising:
   1) obtaining location info about the electronic device, the location info collected by the electronic device;
   2) obtaining a code via the electronic device, the code entered at the electronic device by the payer, the location info plus the code corresponding to the payee, the code including a numeric number, a letter, or a sign, the payer and the payee each having an account at a processing center;
   3) sending a request message from the electronic device to the processing center for the payer to pay the payee, the request message including account info on the payer's account, the location info about the electronic device, and the code entered by the payer; and
   4) receiving at the electronic device a confirmation message or confirmation info about the payment transaction from the processing center, the confirmation message or confirmation info including information confirming the payment transaction.

2. The method according to claim 1 wherein the location info is obtained via a global positioning system (GPS).

3. The method according to claim 1 wherein the location info is obtained via a service facility.

4. The method according to claim 1 wherein the code is entered by the payer via a key-in method.

5. The method according to claim 1 wherein the code is entered by the payer via voice input.

6. The method according to claim 1 wherein the code contains less than four elements, the elements including a single-digit numeric number, a letter, or a sign.

7. The method according to claim 1 wherein the code is displayed in public.

8. A method performed at a processing center for payment transaction between a payee and a payer, the payee and the payer each having an account at the processing center, comprising:
   1) obtaining a payee message at the processing center, the payee message sent from a payee device of the payee, the payee message including account info on the payee's account and payment amount of the payment transaction;
   2) obtaining a payer message at the processing center, the payer message sent from a payer device of the payer, the payer message including account info on the payer's account, location info on location of the payer device, and a code, the code entered at the payer device by the payer, the location info plus the code corresponding to the payee, the code including a numeric number, a letter, or a sign;

3) implementing a payment process at the processing center for the payer to pay the payee by the payment amount; and 4) sending confirmation info about the payment transaction from the processing center to the payee and payer devices respectively, the confirmation info including information confirming the payment transaction.

9. The method according to claim 8 wherein the payee device is a point of sale (POS) system.

10. The method according to claim 8 wherein the payee device is a card reader device.

11. The method according to claim 8 wherein the payee message is sent from the payee device via a payment app.

12. The method according to claim 8 wherein the code is entered by the payer at the payer device via a key-in method.

13. The method according to claim 8 wherein the code is entered by the payer at the payer device via voice input.

14. The method according to claim 8 wherein the code is displayed in public.

15. A method arranged for a payer's electronic device for payment transaction between the payer and a payee, comprising:

1) obtaining location info about the electronic device, the location info collected by the electronic device;

2) sending the location info from the electronic device to a processing center;

3) receiving at the electronic device a reply message from the processing center, the reply message including information about a plurality of entities related to the location info;

4) presenting a plurality of graphic objects on a display of the electronic device for the payer to select, the graphic objects representing the entities related to the location info respectively;

5) obtaining a code via the electronic device, the code entered at the electronic device by the payer, the code plus a graphic object selected by the payer corresponding to the payee, the code including a numeric number, a letter, or a sign;

6) sending a request message from the electronic device to the processing center for the payer to pay the payee, the request message including information on the payer's account at the processing center, the graphic object or an entity selected by the payer, and the code entered by the payer; and 7) receiving at the electronic device a confirmation message or confirmation info about the payment transaction from the processing center, the confirmation message or confirmation info including information confirming the payment transaction.

16. The method according to claim 15 wherein the location info is obtained via a global positioning system (GPS).

17. The method according to claim 15 wherein the location info is obtained via a service facility.

18. The method according to claim 15 wherein the code is entered by the payer via a key-in method.

19. The method according to claim 15 wherein the code is entered by the payer via voice input.

20. The method according to claim 15 wherein the code contains less than four elements, the elements including a single-digit numeric number, a letter, or a sign.

\* \* \* \* \*